United States Patent [19]
Suzuki et al.

[11] Patent Number: 5,551,396
[45] Date of Patent: Sep. 3, 1996

[54] DEVICE FOR COPING WITH SENSOR ABNORMAL STATE IN ELECTRONIC CONTROL SYSTEM FOR INTERNAL COMBUSTION ENGINE

[75] Inventors: Norio Suzuki; Yousuke Tachibana, both of Wako, Japan

[73] Assignee: Honda Giken Kogyo Kabushiki Kaisha, Tokyo, Japan

[21] Appl. No.: 498,299

[22] Filed: Jul. 3, 1995

[30] Foreign Application Priority Data

Jul. 6, 1994 [JP] Japan ................................. 6-176148

[51] Int. Cl.⁶ .................................................. F02D 41/22
[52] U.S. Cl. .................................. 123/399; 123/479
[58] Field of Search ....................... 123/339.15, 399, 123/479

[56] References Cited

U.S. PATENT DOCUMENTS 4,274,381  6/1981  Abo .......................................... 123/479
4,450,812  5/1984  Otsuka et al. ......................... 123/479 X Primary Examiner—Tony M. Argenbright
Attorney, Agent, or Firm—Armstrong, Westerman, Hattori, McLeland & Naughton

[57] ABSTRACT

A device for coping with a sensor abnormal state in an electronic control system in an internal combustion engine in which a predetermined operation control device is controlled in response to detection signals obtained from various engine sensors. The device includes an engine speed sensor and a temperature sensor. A discriminator determines that the temperature sensor is abnormal when a state, in which engine speed $N_E$ is less than a predetermined value $n_A$ and concurrently temperature $T_W$ is less than a predetermined value $T_A - \Delta_A$, continues for a predetermined time $tm_{DT}$. The detected temperature value $T_W$ is corrected to a larger value provisionally to decrease the rotational speed $N_E$ of the engine when the abnormal state is indicated.

4 Claims, 4 Drawing Sheets

DEVICE FOR COPING WITH SENSOR ABNORMAL STATE IN ELECTRONIC CONTROL SYSTEM FOR INTERNAL COMBUSTION ENGINE

BACKGROUND OF THE INVENTION

This invention relates to a fail safe when an abnormal state occurs in a sensor in an electronic control system of an internal combustion engine.

When an abnormal state occurs in a sensor in general, normally an operation for coping with the sensor abnormal state in which an abnormal state is discriminated by detecting that a detected value exceeds a limit value and an operation of the system is stopped or the operation is continued in reference to the fixed limit value in place of the detected value by the sensor is carried out.

However, the stopping in operation of one electronic control system of the internal combustion engine corresponds in general to the stopping in operation of the internal combustion engine and it is not efficient to stop the operation of the internal combustion engine due to the cause of abnormal state in one sensor.

Further, even if the operation of the internal combustion engine is continued at the fixed limited value, it is sometimes happened that an abnormal state in operation occurs.

In particular, in the case that an abnormal state occurs in a sensor for detecting a temperature related to a temperature of the engine, such as a water temperature sensor for detecting the engine water temperature for example, the sensor shows a lower value irrespective of the fact that the temperature of the engine is actually and substantially high during warming of the engine, and when the operation is controlled in response to the detected low temperature, the rotational speed of the engine is increased more than that required and then a so-called blowing-up of the engine speed occurs.

SUMMARY OF THE INVENTION

It is an object of the present invention to provide a device for coping with a sensor abnormal state in an electronic control system for an internal combustion engine in which a detected value by the temperature sensor is set to be large provisionally in the case that the detected value by the temperature sensor is less than a predetermined value and discriminated as an abnormal state, to prevent positively an abnormal increase of the engine speed and continue the operation.

In order to accomplish the aforesaid object, the present invention provides a device for coping with a sensor abnormal state in an electronic control system for controlling an internal combustion engine in response to detection signals obtained from various sensors of the internal combustion engine comprising, an engine speed sensor for outputting a first signal indicating a rotational speed of the engine; a temperature sensor for outputting a second signal indicating a temperature related to a temperature of the engine; a first detecting means for detecting that said rotational speed indicated by said first signal is higher than a predetermined speed; a second detecting means for detecting that said temperature indicated by said second signal is lower than a predetermined temperature; a discriminating means for discriminating that said temperature sensor is in an abnormal state when a state in which said first detecting means detects that said rotational speed indicated by said first signal is higher than said predetermined speed and said second detecting means detects that said temperature indicated by said second signal is lower than said predetermined temperature is continued for a predetermined time; and a correcting means for correcting said temperature indicated by said second signal to a higher temperature provisionally so as to decrease the rotational speed of the engine when said discriminating means discriminates the abnormal state.

When the discriminating means discriminates the abnormal state, the correcting means corrects the second signal to indicate a higher temperature provisionally and restricts an abnormal increasing of the engine speed. Therefore, the blowing-up of the engine speed to be caused when the temperature sensor detects an abnormal temperature is positively prevented and a normal operating state of the engine can be maintained.

DETAILED DESCRIPTION OF THE PREFERRED EMBODIMENT

Referring now to FIGS. 1 to 4, one preferred embodiment of the present invention will be described.

Figure 1:
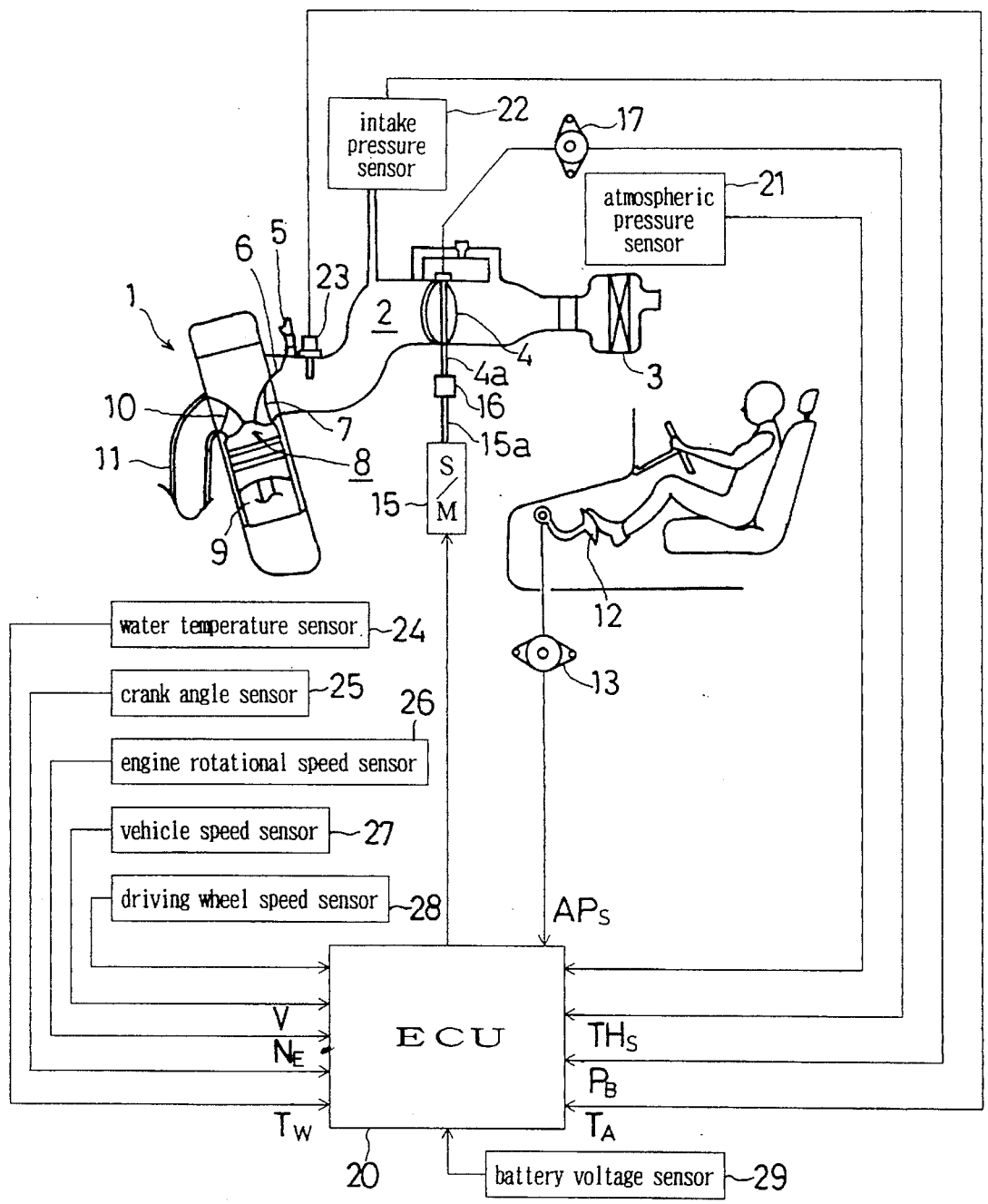
FIG. 1 is an entire schematic view for showing a fuel supplying control system of an internal combustion engine of one preferred embodiment of the present invention.

This preferred embodiment is applied to an internal combustion engine mounted on a vehicle, and FIG. 1 is an entire schematic view for showing a fuel supplying control system of the internal combustion engine.

An air intake passage 2 for supplying fuel to the internal combustion engine 1 is provided with an air cleaner 3 at its upstream end, a throttle valve 4 is arranged in the midway part of the passage in such a way that the air intake passage 2 can be opened or closed, a fuel injection valve 5 is arranged at a downstream end of the passage, wherein a flow rate of air fed into the air intake passage 2 through an air cleaner 3 is adjusted by the throttle valve 4, the air enters an intake manifold 6, and then the air flows into a combustion chamber 8 through the air intake port opened or closed by an air intake valve 7 together with fuel injected from the fuel injection valve 5.

The entered mixture gas burns to drive a piston 9, flows through an exhaust port opened or closed by an exhaust valve 10, passes through an exhausting passage from an exhaust manifold 11 and is discharged out of the engine.

An accelerator pedal 12 is arranged at a floor surface of a driver's compartment of the vehicle on which the internal combustion engine is mounted. The accelerator pedal 12 is biased to an idling position by a spring and oscillated in response to a pressing action of a driver.

As shown in FIG. 1, the accelerator pedal 12 and the throttle valve 4 are not mechanically connected to each other, a pressing amount of the accelerator pedal 12 is sensed by an accelerator sensor 13 comprised of a potentiometer installed at the oscillating shaft of the accelerator pedal 12, the throttle valve 4 is driven to open or close by the stepping motor 15, and the stepping motor 15 is operated in response to a driving signal produced from an electronic control unit ECU 20.

The driving shaft 15a of the stepping motor 15 is coaxial with the valve shaft 4a of the throttle valve 4 and directly connected by means of the connecting part 16 without intervening a speed changing connector such as a gear or the like.

A normal rotating angle or a reverse rotating angle of the stepping motor 15 becomes directly an opening or closing angle of the throttle valve 4.

The opening or closing angle of this throttle valve 4 is sensed by the throttle sensor 17 comprising a potentiometer and the like, and a detecting signal is inputted to ECU 20.

An atmospheric pressure sensor 21 is arranged at an upstream side of the air intake passage 2, an air intake pressure sensor 22 for sensing an absolute pressure of intake air is arranged at a downstream side of the throttle valve 4, and further an intake air temperature sensor 23 for detecting a temperature of the intake air is arranged at the downstream side.

A water temperature sensor 24 for detecting a temperature of cooling water corresponding to a second sensor in the present invention is arranged at a proper position near the combustion chamber 8 of the internal combustion engine 1, a crank angle sensor 25 is installed within a distributor, and an engine rotational speed sensor 26, a vehicle speed sensor 27 and a driving wheel speed sensor 28 which correspond to the first sensor in the present invention are arranged at proper locations.

Each of the detecting signals from the sensors described above is inputted to ECU 20.

Further, in the control device of the present invention, other detecting signals produced from various kinds of sensors such as a battery voltage sensor 29 for detecting a battery voltage are outputted to ECU 20.

In this case, the stepping motor 15 is a hybrid-type four-phase stepping motor which is driven by a two-phase exciting driving system.

Figure 2:
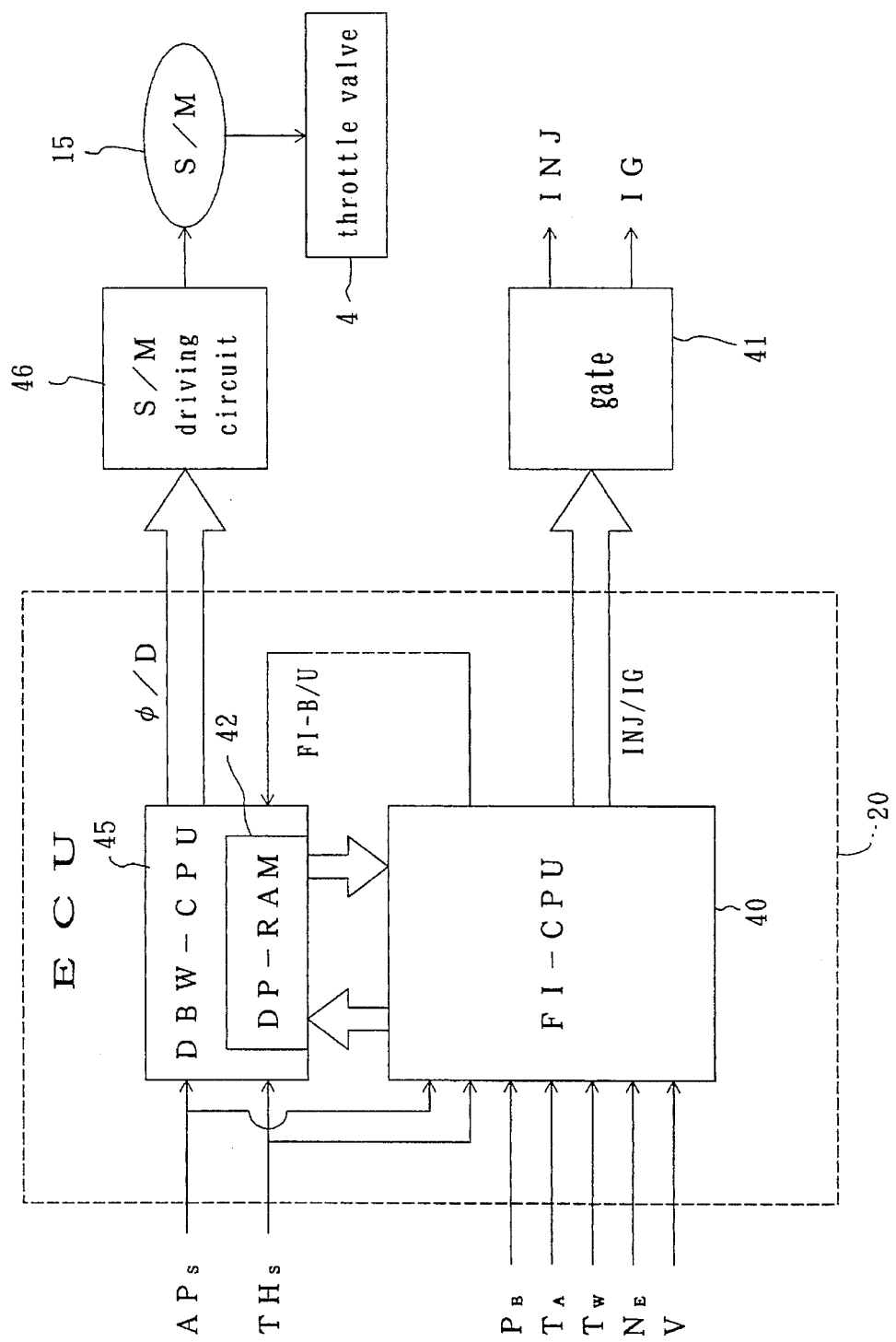
FIG. 2 is a schematic block diagram for showing a control system of the fuel supplying control system.

A schematic block diagram of this control system is shown in FIG. 2.

Within ECU 20, a fuel supplying control is carried out by an FI-CPU 40 and to the FI-CPU 40 are inputted the detecting signals produced from the aforesaid various sensors for detecting an operating condition of the internal combustion engine, for example, an absolute pressure $P_B$ within the air intake pipe, an air intake temperature $T_A$, an engine water temperature $T_W$, an engine rotational speed $N_E$, a vehicle speed V, an accelerator pedal angle $AP_S$ produced from the aforesaid accelerator sensor 13 and a throttle valve opening degree $TH_S$ produced from the throttle sensor 17 and the like, then INJ signal for controlling the fuel injection valve 5 and IG signal for controlling an ignition time are outputted through the gate 41 in response to the operating condition.

Control of a degree of opening of the throttle valve 4 under an operation of the stepping motor 15 is carried out by DBW-CPU 45, in which signals of the accelerator pedal angle $AP_s$ and the throttle valve opening degree $TH_s$ detected by the aforesaid accelerator sensor 13 and the throttle sensor 17 are inputted, and from which signals relating an exciting phase $\phi$ and duty D for driving the stepping motor 15 is outputted to the stepping motor driving circuit 46. And then the stepping motor 15 is driven by the stepping motor driving circuit 46.

The detected signal produced from the sensor for sensing an operating condition as well as the detected signals by the accelerator sensor 13 or the throttle sensor 17 are also inputted to the FI-CPU 40. Based on each of the detected signals a target opening degree of the throttle is calculated, respectively, and these informations are transmitted to DBW-CPU 45 through DP-RAM 42 executing exchange of signals between FI-CPU 40 and DBW-CPU 45.

DBW-CPU 45 determines a final target throttle opening degree $TH_O$ by applying various corrections during operation on the basis of these informations, sets the aforesaid exciting phase $\phi$ and duty D of current supplied to the stepping motor 15 so as to cause the throttle opening degree of the throttle valve 4 to become the final target throttle opening degree $TH_O$ and outputs them.

FI-CPU 40 can back-up the DBW-CPU 45 directly in response to either an operating condition or an abnormal state and at this time the exchange of signals through DP-RAM 42 is stopped.

Figure 4:
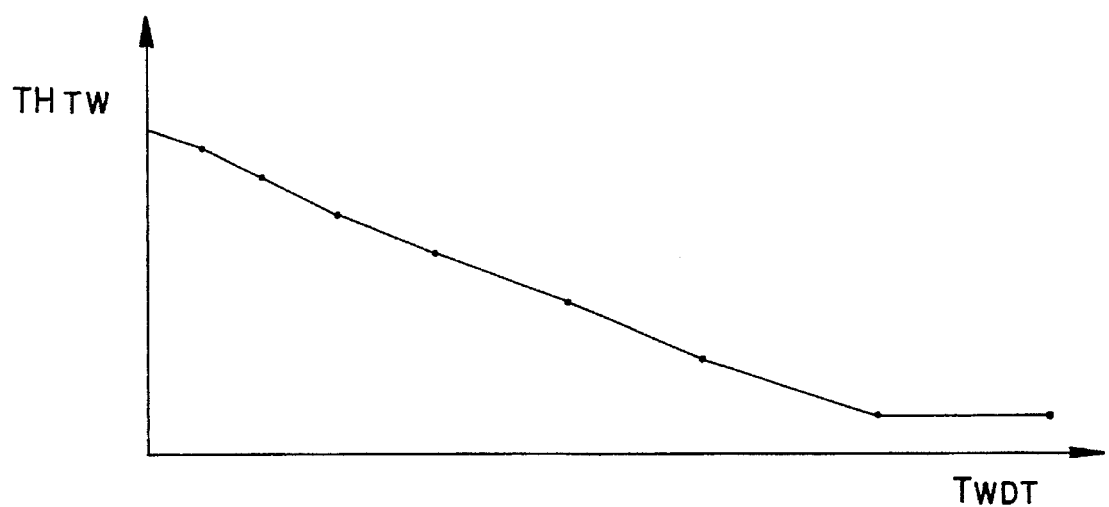
FIG. 4 is a view in which a table for retrieving the corrected added value $TH_{TW}$ from the pseudo water temperature $T_{WDT}$ is shown by a graph.

The final target throttle opening degree $TH_O$ is basically one in which an idle throttle opening degree $TH_{IDL}$ related to an external load is mainly added to a target throttle opening degree $TH_{AP}$ calculated in response to the detected value by the accelerator sensor 13 which is a pressing angle of the accelerator pedal 12, a correction added value $TH_{TW}$ based on the engine water temperature $T_W$ detected by the water temperature sensor 24 is added to it as a correction item and this is expressed by the following equation.

$$TH_O = TH_{AP} + TH_{IDL} + TH_{TW}$$

where, the correction added value $TH_{TW}$ has a relation in which it is decreased as the engine water temperature $T_w$ is increased (refer to FIG. 4).

That is, the value $TH_{TW}$ added to the throttle opening degree is reduced as the engine water temperature $T_W$ is increased, and an opening of the throttle opening degree is restricted so as to limit an increasing of the engine rotational speed $N_E$.

However, in the case that the water temperature sensor 24 shows an abnormal state due to trouble and the detected engine water temperature $T_W$ is lower than its normal value, the rotational speed $N_E$ of the engine is increased while the corrected added value $TH_{TW}$ is high and the rotational speed $N_E$ is not substantially restricted and in particular as a substantial low engine water temperature $T_W$ is detected due to an abnormal state of the water temperature sensor 24 during an idling operation, a so-called blowing-up of the engine rotational speed occurs, that is, the engine rotational speed $N_E$ is abnormally increased while the corrected added value $TH_{TW}$ causes an increasing of the throttle opening degree.

In view of the foregoing, a pseudo water temperature $T_{WDT}$ is set in addition to the engine water temperature $T_W$ detected by the water temperature sensor 24, and when there is a possibility that an abnormal state occurs in the water temperature sensor 24, the pseudo water temperature $T_{WDT}$ is applied to retrieve the corrected added value $TH_{TW}$ for a throttle valve opening degree control.

Figure 3:
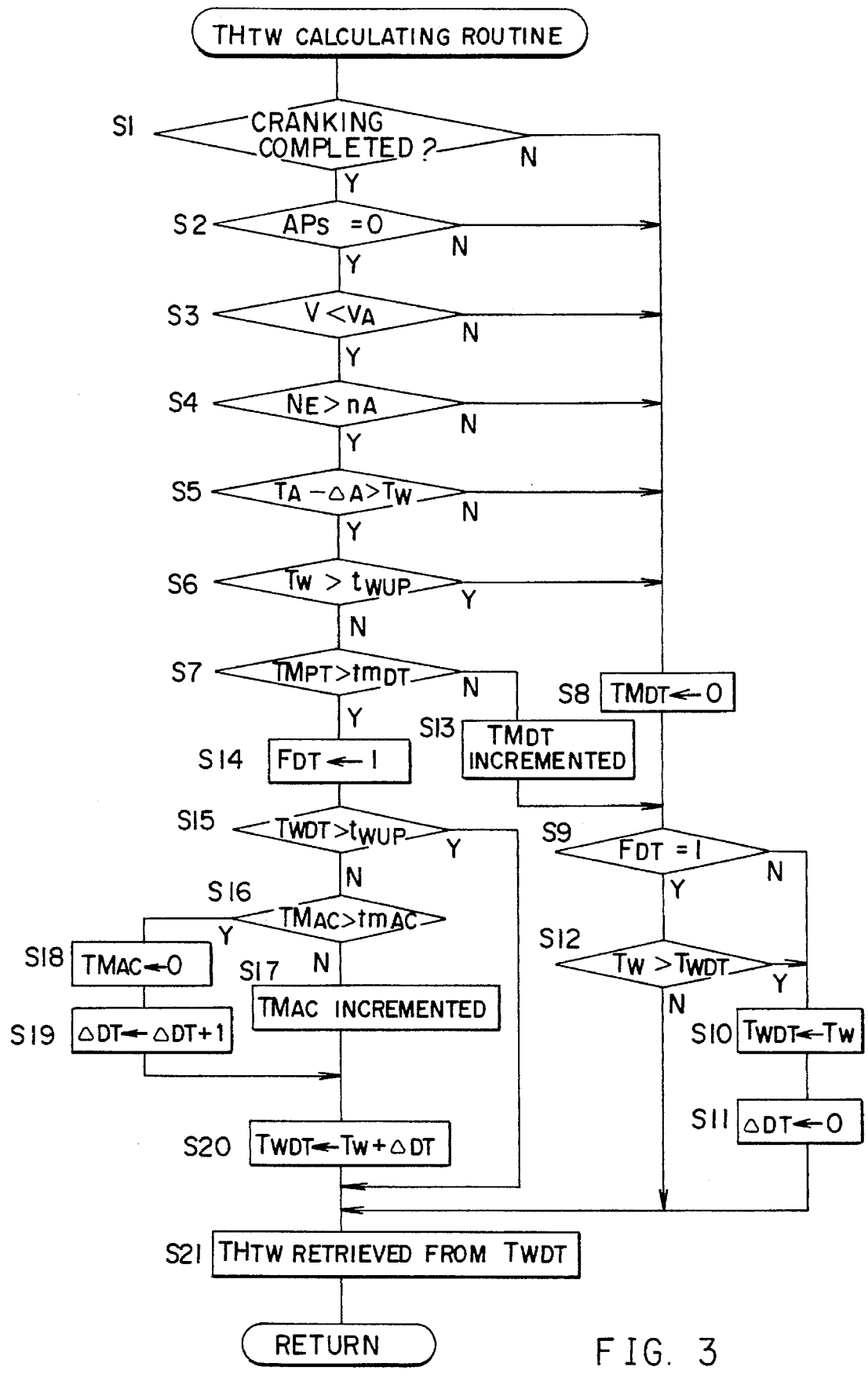
FIG. 3 is a flow chart for showing a procedure for calculating the corrected added value $TH_{TW}$ in the control system.

FIG. 3 is a flow chart for showing a procedure for calculating the corrected added value $TH_{TW}$ and the operation will be described as follows in reference to the flow chart.

At first, at the step 1, it is discriminated if the cranking operation is completed, i.e. whether or not the engine is started with the starter motor and if the cranking operation is being carried out, the operation jumps to the step 8 and if the cranking operation is already completed, the operation proceeds to the next step 2.

It is discriminated at the step 2 if the accelerator pedal angle $AP_s$ is "0", i.e. the driver presses the accelerator pedal 12 or not, and if the driver presses the pedal, the operation jumps to the step 8, and if the driver does not press the pedal, the operation proceeds to the step 3 so as to discriminate if the vehicle speed V is slower than a predetermined slow speed $v_A$ (for example, 5 km/h), and the speed is faster than $V_A$ and the vehicle is running, the operation jumps to the step 8, and when the vehicle shows a quite slow speed slower than $v_A$ or the vehicle stops, the operation proceeds to the step 4 so as to discriminate if the engine rotational speed $N_E$ is larger than a predetermined rotational speed $n_A$ for idling operation, and if the value $N_E$ is less than $n_A$, the operation jumps to the step 8 and if the value $N_E$ is larger than $n_A$, the operation advances to the step 5.

That is, when the accelerator pedal 12 is not pressed, an idling state in which the vehicle is being approximately stopped is kept and the engine rotational speed $N_E$ is larger than a predetermined rotational speed $n_A$ for the idling operation, the operation advances to the step 5, and if the other state occurs, the operation jumps to the step 8.

Then, at the step 5, it is discriminated if the engine water temperature $T_w$ is lower than the air intake temperature $T_A$ by more than a predetermined temperature $\Delta_A$, i.e. if the engine water temperature is substantially low as compared with the air intake temperature $T_A$. When the temperature $T_w$ is not low, the operation jumps to the step 8 with a conclusion that the water temperature sensor 24 is being operated normally, and when the temperature $T_w$ substantially lower as compared with the air intake temperature $T_A$, the operation advances to the step 6 with an assumption that there is a possibility that the water temperature sensor 24 has a certain trouble.

When the operation advances to the step 6, it discriminated if the engine water temperature $T_W$ is higher than a warming-up limit temperature $t_{WUP}$ and if the engine water temperature exceeds the warming-up limit temperature $t_{WUP}$, it is discriminated that the engine water temperature $T_w$ is absolutely high and the operation jumps to the step 8 under an assumption of no problem and in turn if the warming-up operation is being carried out at a temperature less than the warming-up limit temperature $t_{WUP}$, the operation advances to the step 7.

When the operation advances to the step 7, this corresponds to the case in which the engine water temperature $T_w$ is substantially low irrespective of the fact that the rotational speed $N_E$ of the engine is high during warming-up operation and there is a possibility of occurrence of abnormal state in the water temperature sensor 24, wherein the rotational speed $N_E$ of the engine is increased more to have a possibility of blowing-up. Accordingly, the operation advances from the step 7 to the step 14 so as to perform a specified coping with sensor abnormal state (a pseudo water temperature dealing).

In the case other than the above that the pseudo water temperature dealing is not carried out, all the operations advance to the step 8 and the case in which the operation proceeds to the step 8 will be described in advance.

At the step 8, the pseudo water temperature timer value $TM_{DT}$ is cleared and set to "0". And then, at the step 9, it is discriminated if "1" is set at a pseudo water temperature flag $F_{DT}$ which indicates whether of not the operation of the pseudo water temperature processing has been carried out. When the flag $F_{DT}$ is not set to "1", the operation proceeds to the step 10, the engine water temperature $T_w$ detected by the water temperature sensor 24 is applied as the pseudo water temperature $T_{WDT}$ and then at the step 11, an incrementing temperature $\Delta_{DT}$ is set to "0" and the operation jumps to the step 21.

In the case that the pseudo water temperature flag $F_{DT}$ is set to "1" at the step 9, the operation jumps to the step 12 so as to discriminate if the engine water temperature $T_w$ is higher than the pseudo water temperature $T_{WDT}$ and if the former is higher than the latter, the operation advances to the aforesaid step 10 and in turn if the former is lower than the latter, the operation jumps directly to the step 21.

At the step 21, the corrected added value $TH_{TW}$ retrieved in a table on the basis of the pseudo water temperature $T_{WDT}$.

Accordingly, in the case that the operation follows a route passing through the step 10, the corrected added value $TH_{TW}$ is retrieved in a table on the basis of the engine water temperature $T_w$ due to the fact that the pseudo water temperature $T_{WDT}$ is the same as the engine water temperature $T_W$.

In the case that the engine water temperature $T_W$ is lower than the pseudo water temperature $T_{WDT}$ after the pseudo water temperature processing has been carried out (a route advancing directly from the step 12 to the step 21), the higher pseudo water temperature $T_{WDT}$ itself is applied on performing a retrieval in a table.

Accordingly, in the case that there is no possibility of occurrence of abnormal state in the usual water temperature sensor 24, though the temperature is converted into the pseudo water temperature $T_{WDT}$ once (steps 10 and 11), a table retrieval for the corrected added value $TH_{TW}$ is carried out at the substantial engine water temperature $T_w$ and thus a so-called pseudo water temperature dealing is not carried out.

Then, in the case that the operation transfer from the aforesaid step 6 to the step 7, at first, it is discriminated if the pseudo water temperature timer value $TM_{DT}$ reaches a predetermined time $tm_{DT}$ (10 seconds, for example), and the operation advances to the step 13 during a period in which it does not elapse the predetermined time $tm_{DT}$, the pseudo water temperature timer value $TM_{DT}$ is incremented, the operation advances to the aforesaid step 9 and the operation advances to the step 14 when the predetermined time $tm_{DT}$ is elapsed. That is, the pseudo water temperature dealing is started only after there is a possibility of occurrence of abnormal state in the water temperature sensor 24 continued for a predetermined time $tm_{DT}$ and in the case that the aforesaid state is a mere temporary one, it is avoided to perform the pseudo water temperature dealing.

At the step 14, "1" is set at the pseudo water temperature flag $F_{DT}$ and it is discriminated at the next step 15 if the pseudo water temperature $T_{WDT}$ exceeds a warming-up limit temperature $t_{WUP}$, and if the former value exceeds the latter value, the operation jumps to the step 21, the pseudo water temperature dealing is not carried out and in turn when the temperature does not reach the warming-up limit temperature $t_{WUP}$, the operation advances to the step 16 so as to discriminate if an incremental time value $TM_{AC}$ exceeds a predetermined incrementing time $TM_{AC}$ (for example, 1 second), the operation advances to the step 17 until it exceeds the value, the incrementing timer value $TM_{AC}$ is incremented, the operation advances to the step 20 and when the value exceeds the predetermined incrementing time $TM_{AC}$, the operation jumps to the step 18, the incrementing timer value $TM_{AC}$ is cleared to set "0" and at the next step 19, an incrementing temperature $\Delta_{DT}$ is increased by "1" and the operation advances to the step 20.

At the step 20, the incrementing temperature $\Delta_{DT}$ is added to the engine water temperature $T_W$ so as to get the pseudo water temperature $T_{WDT}$, and at the next step 21, the corrected added value $TH_{TW}$ is retrieved in a table in reference to this pseudo water temperature $T_{WDT}$.

That is, when the operation starts to perform the pseudo water temperature dealing, the incrementing temperature $\Delta_{DT}$ is 0 (at the step 11) at the beginning, the incrementing temperature $\Delta_{DT}$ is increased in a stepwise manner once every time it elapses the predetermined incrementing time $TM_{AC}$ and concurrently, the pseudo water temperature $T_{WDT}$ is gradually increased once every time and the corrected added value $TH_{TW}$ is retrieved in response to this incrementing pseudo water temperature $T_{WDT}$.

The table at the step 21 is formed as shown in a graph of FIG. 4, wherein an axis of abscissas indicates the pseudo water temperature $T_{WDT}$ and an axis of ordinates indicates the corrected added value $TH_{TW}$, the corrected added value $TH_{TW}$ to be retrieved is indicated at a right downward direction in respect to the pseudo water temperature $T_{WDT}$, and the corrected added value $TH_{TW}$ is decreased as the pseudo water temperature $T_{WDT}$ is increased.

In the case that the engine rotational speed $N_E$ is larger than a predetermined engine rotational speed $n_A$ during warming-up operation of the engine while the vehicle is being stopped and that a predetermined time $tm_{DT}$ elapses under a predetermined condition in which the engine water temperature $T_W$ is substantially lower than the air intake temperature $T_A$, there is a possibility of occurrence of abnormal state of the water temperature sensor 24, so that the corrected added value $TH_{TW}$ is retrieved on the basis of the pseudo water temperature $T_{WDT}$ gradually increased from the abnormal low engine water temperature $T_W$ sensed by the water temperature sensor 24. As the result, a low corrected added value $TH_{TW}$ is retrieved as clear from FIG. 4, thereby a target throttle opening degree $TH_O$ for driving the stepping motor 15 is restricted toward a closing side due to the decreased added value. Accordingly, an increasing of the engine rotational speed $N_E$ is restricted and the blowing-up of the engine rotational speed can be prevented.

In addition, even if the water temperature sensor 24 shows an abnormal state, it is possible to prevent the rotational speed of the engine from being increased, keep the internal combustion engine 1 at a normal operating state and run the vehicle to a certain degree.

When the rotational speed $N_E$ of the engine is decreased under a restriction of the degree of opening of the throttle and become lower than the predetermined rotational speed $n_A$, the operation jumps from the step 4 to the step 8 so as to stop the aforesaid pseudo water temperature dealing.

In the case that the pseudo water temperature $T_{WDT}$ exceeds the warming-up limit temperature $t_{WUP}$, the operation jumps from the step 15 to the step 21, the pseudo water temperature $T_{WDT}$ is fixed, the corrected added value $TH_{TW}$ is not decreased more than that so as to stop the substantial pseudo water temperature dealing.

According to the present invention, when the discriminating means discriminate that the detected value by the temperature sensor is less than a predetermined value and abnormal, the correcting means set the detected value by the temperature sensor to a large value provisionally so as to restrict an abnormal increasing of the engine rotational speed, so that it is possible to prevent so-called blowing-up of the engine rotational speed from being induced due to an abnormal detected temperature by the temperature sensor and maintain a normal operating state of the internal combustion engine.

What is claimed is:

1. A device for coping with a sensor abnormal state in an electronic control system for controlling an internal combustion engine in response to detection signals obtained from various sensors of the internal combustion engine comprising:

an engine speed sensor for outputting a first signal indicating a rotational speed of the engine;

a temperature sensor for outputting a second signal indicating a temperature related to a temperature of the engine;

a first detecting means for detecting that said rotational speed indicated by said first signal is higher than a predetermined speed;

a second detecting means for detecting that said temperature indicated by said second signal is lower than a predetermined temperature;

a discriminating means for discriminating that said temperature sensor is in an abnormal state when a state in which said first detecting means detects that said rotational speed indicated by said first signal is higher than said predetermined speed and said second detecting means detects that said temperature indicated by said second signal is lower than said predetermined temperature is continued for a predetermined time; and a correcting means for correcting said temperature indicated by said second signal to a higher temperature provisionally so as to decrease the rotational speed of the engine when said discriminating means discriminates the abnormal state.

2. A device for coping with a sensor abnormal state according to claim 1, wherein said electronic control system controls a throttle valve electrically and has a throttle valve opening degree calculating means for calculating a throttle valve opening degree in response to the detection signals obtained from various sensors, in said calculation of the throttle valve opening degree the output from said temperature sensor being added as a throttle opening degree correction added value which is decreased as said provisional temperature corrected by said correcting means is increased.

3. A device for coping with a sensor abnormal state according to claim 1, wherein said correcting means does not correct said temperature indicated by said second signal when said rotational speed indicated by said first signal is lower than said predetermined speed or said temperature indicated by said second signal is higher than said predetermined temperature.

4. A device for coping with a sensor abnormal state according to claim 2, wherein said provisional temperature corrected by said correcting means is kept at a fixed value when said provisional temperature exceeds a warming-up limit temperature of the engine.

* * * * *